(12) United States Patent
Pence (10) Patent No.: US 10,422,129 B1
(45) Date of Patent: Sep. 24, 2019

(54) CORRUGATED METAL DECK ASSEMBLY WITH INTEGRATED SUPPORT CHANNELS

(71) Applicant: Robert Corey Pence, Oak Park, MI (US)

(72) Inventor: Robert Corey Pence, Oak Park, MI (US)

( * ) Notice: Subject to any disclaimer, the term of this patent is extended or adjusted under 35 U.S.C. 154(b) by 0 days.

(21) Appl. No.: 15/998,323

(22) Filed: Aug. 6, 2018

(51) Int. Cl.
*E04B 5/40* (2006.01)
*E04B 1/41* (2006.01)
*E04B 5/32* (2006.01)
*F16B 37/04* (2006.01)

(52) U.S. Cl.
CPC .............. *E04B 5/40* (2013.01); *E04B 1/4121* (2013.01); *E04B 2005/324* (2013.01); *F16B 37/045* (2013.01)

(58) Field of Classification Search
CPC ..... E04B 5/40; E04B 1/4121; E04B 2005/324
See application file for complete search history.

(56) References Cited

U.S. PATENT DOCUMENTS

| | | | | |
|---|---|---|---|---|
| 4,741,134 A | * | 5/1988 | Stohs | E04B 5/40 174/486 |
| 4,781,001 A | * | 11/1988 | Ryan | H02G 3/283 174/486 |
| 4,837,994 A | * | 6/1989 | Stohs | E04B 5/40 174/486 |
| 7,987,647 B2 | * | 8/2011 | Rymell | E04D 3/3608 52/408 |
| 8,931,232 B2 | * | 1/2015 | Kelly | F16B 43/00 411/368 |
| 9,181,691 B2 | * | 11/2015 | Thompson | E04B 1/4121 |
| 9,726,303 B1 | * | 8/2017 | Gretz | F16L 3/00 |
| 9,982,427 B2 | * | 5/2018 | Grahek | |
| 2016/0069066 A1 | | 3/2016 | Connell et al. | |

* cited by examiner

*Primary Examiner* — Andrew J Triggs
(74) *Attorney, Agent, or Firm* — Mark E. Wiemelt (57) ABSTRACT

A corrugated metal deck assembly including an elongated corrugated metal deck portion having substantially longitudinally extending, generally U-shaped peaks and valleys. One or more support channels are formed integrally with the corrugated metal deck portion prior to casting concrete thereon. Each of the support channels are configured with a generally U-shaped cross-section having generally opposed side walls having leg portions extending generally laterally inwardly from the corresponding side walls and defining a slot facing generally downwardly from the corrugated metal deck. The support channels are adapted for receiving therethrough and supportably engaging at least portions of anchors or support items. The slots may be provided with one or more internal threads into which externally threaded portions of anchors or support items may be screwed to fixedly attach the anchors or support items to the one or more integrated support channels.

5 Claims, 7 Drawing Sheets

CORRUGATED METAL DECK ASSEMBLY WITH INTEGRATED SUPPORT CHANNELS

BACKGROUND OF THE INVENTION

1. Field of the Invention

The invention generally relates to a corrugated metal deck assembly with one or more integrated support channels. More specifically, the invention relates to a corrugated metal deck assembly with one or more integrated support channels for use with curable construction material, e.g., concrete, which is cast thereon, for supportably engaging anchors or support items, e.g, all thread, for supporting construction equipment, e.g., mechanical, electrical or plumbing equipment, or other items.

2. The Prior Art

There are a variety of prior art devices for use with composite metal deck and concrete ceilings or floors for holding suspended construction equipment, e.g., mechanical, electrical or plumbing equipment. However, prior art devices generally require that anchors or support items for supporting construction equipment be disposed prior to casting the concrete, whether in situ or precast off site, or that openings for the anchors or support items be drilled or shot through the metal deck and into the concrete after installation and casting. The former method inhibits the process of adding, removing, or moving anchors or support items after the concrete is cast. The latter method generally involves unnecessary dust, noise, and vibration, as well as time-consuming, expensive, and dangerous labor, including the use of power tools and vacuums on ladders, scaffolding or mechanical lifts. There is no satisfactory known solution to these problems provided in the prior art.

SUMMARY OF THE INVENTION

It is therefore an objective of this invention to provide a corrugated metal deck assembly with one or more integrated support channels for use with curable construction material, e.g., concrete, which is cast thereon, for supportably engaging anchors or support items, e.g, all thread, for supporting construction equipment, e.g., mechanical, electrical or plumbing equipment, or other items.

Another object of the invention is to provide a corrugated metal deck assembly with one or more integrated support channels for use with concrete that may be precast or cast in situ.

Still another object of the invention is to provide a corrugated metal deck assembly with one or more integrated support channels for use with concrete that reduces in situ dust, noise, and vibration, as well as time-consuming, expensive, and dangerous labor, including the use of power tools and vacuums on ladders, scaffolding or mechanical lifts.

Yet another object of the invention is to provide a corrugated metal deck assembly with one or more integrated support channels for use with concrete that is simple to use, easy to manufacture, and inexpensive.

Still another object of the invention is to provide a corrugated metal deck assembly with one or more integrated support channels for use with concrete that allows flexibility in and eases the process of adding, removing, or moving anchors or support items after the concrete is cast.

These together with other objects of the present invention, along with the various features of novelty which characterize the present invention, are pointed out with particularity in the claims annexed to and forming a part of this disclosure. For a better understanding of the present invention, its operating advantages and the specific objects attained by its uses, reference should be had to the accompanying drawings and descriptive matter in which there is illustrated a preferred embodiment of the present invention and alternative embodiments.

In a preferred embodiment, a corrugated metal deck assembly including an elongated corrugated metal deck portion having substantially longitudinally extending, generally U-shaped peaks and valleys is provided. One or more support channels are formed integrally with the corrugated metal deck portion, such as by cold-forming, prior to casting concrete thereon. The support channels extend generally parallel to the peaks and valleys along the length of the corrugated metal deck portion. Each of the support channels is configured with a generally U-shaped cross-section having generally opposed side walls having leg portions extending generally laterally inwardly from the corresponding side walls and defining a slot facing generally downwardly from the corrugated metal deck portion. The slots are adapted for receiving therethrough and supportably engaging at least portions of anchors or support items. The corrugated metal deck assembly with one or more integrated support channels is galvanized for corrosion protection prior to setting concrete thereon. The slots may be provided with internal threads into which externally threaded portions of anchors or support items may be screwed to fixedly attach the anchors or support items to the one or more integrated support channels.

There has thus been outlined, rather broadly, the more important features of the invention in order that the detailed description thereof that follows may be better understood, and in order that the present contribution to the art may be better appreciated. There are, of course, additional features of the invention that will be described hereinafter and that will form the subject matter of the invention.

Before explaining the preferred embodiment and alternative embodiments of the present invention in detail, it is to be understood that the present invention is not limited in its application to the details of construction, to the arrangements of the components set forth in the following description or illustrated in the drawings, or to the methods described therein. The present invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the present invention in any way.

DESCRIPTION OF THE PREFERRED EMBODIMENT

While this present invention is susceptible of embodiments in many different forms, there are shown in the drawings and will be described in detail herein, a preferred embodiment, with like parts designated by like reference numerals and with the understanding that the present disclosure is to be considered as an exemplification of the principles of the present invention, and is not intended to limit the claims to the illustrated preferred embodiment.

Referring now to FIGS. 1-5, in a preferred embodiment, an elongated corrugated metal deck assembly generally indicated at reference numeral 10 including a deck portion 12 defining substantially longitudinally extending, generally U-shaped peaks generally indicated at reference numeral 14 and valleys generally indicated at reference numeral 16 is illustrated. One or more support channels 20 are formed integrally with the deck portion 12, such as by cold-forming, prior to casting concrete 30 thereon. It should be readily understood by those skilled in the art that other suitable manufacturing methods may be employed, without departing from the scope and spirit of the invention. The support channels 20 extend generally parallel to the peaks 14 and valleys 16 along the length of the corrugated metal deck assembly 10. In the preferred embodiment, the support channels 20 are constructed of metal.

In the preferred embodiment, each of the support channels 20 is configured with a generally U-shaped cross-section having generally opposed side walls 22 having leg portions 24 extending generally laterally inwardly from the corresponding side walls 22 and defining a slot generally indicated at reference numeral 26 facing generally downwardly from the corrugated metal deck portion 12. Each slot 26 being adapted for receiving therethrough and supportably engaging at least portions of anchors or support items 40, e.g., rivets, channel nuts, t-head bolt, hammerhead bolt, or the like.

In the preferred embodiment, the corrugated metal deck assembly 10 with one or more integrated support channels 20 is galvanized for corrosion protection prior to setting concrete 30 thereon, although it should be readily understood by those skilled in the art that other suitable protective coatings may be applied, without departing from the scope and spirit of the invention. It should also be readily understood by those skilled in the art the concrete 30 may be precast or cast in situ.

Figure 1:
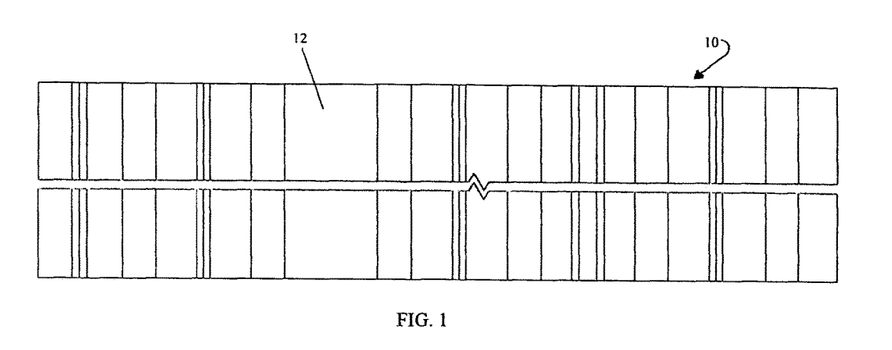
FIG. 1 is a top plan view of a preferred embodiment of the invention.
Figure 2:
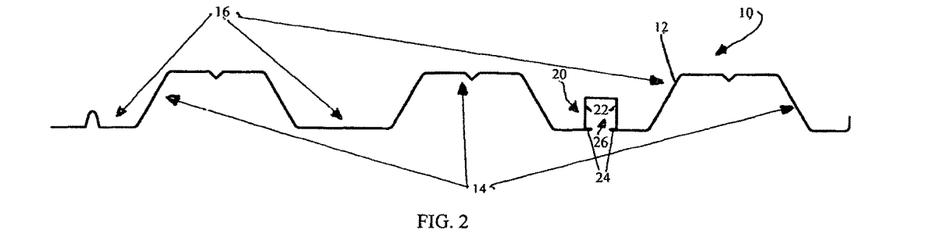
FIG. 2 is a front plan view of a preferred embodiment of the invention.
Figure 3:
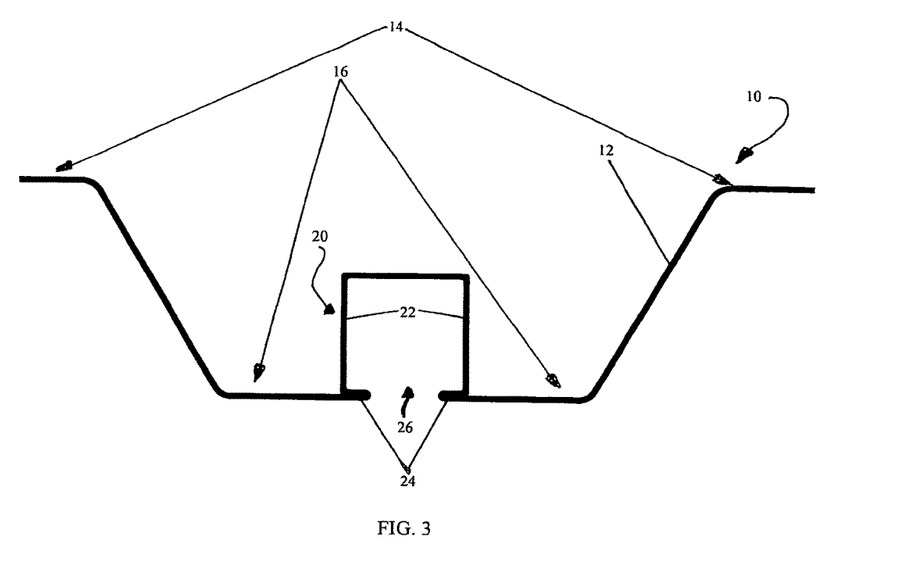
FIG. 3 is an exploded partial sectional view of a preferred embodiment of the invention.
Figure 4:
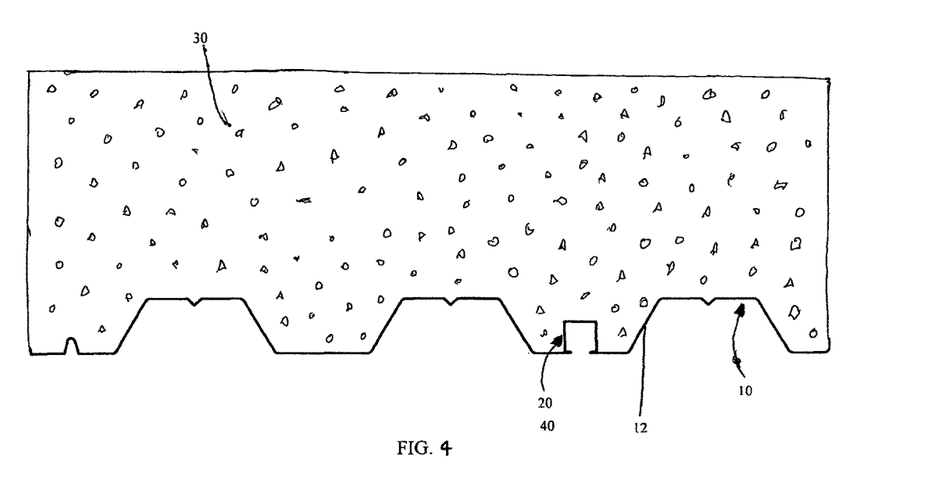
FIG. 4 is a front plan view of a preferred embodiment of the invention with concrete set thereon.
Figure 5:
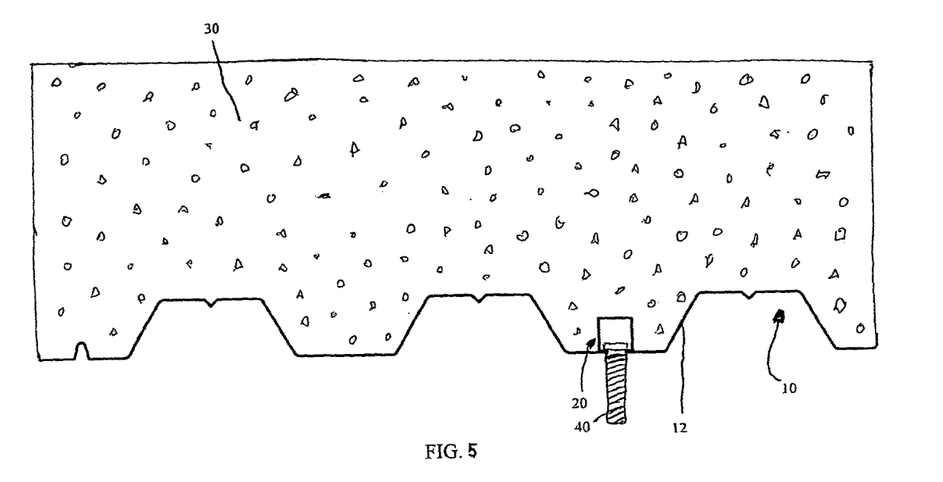
FIG. 5 is a front plan view of a preferred embodiment of the invention with concrete set thereon and a portion of a t-head bolt received through and supportably engaged by a slot of a support channel.
Figure 6:
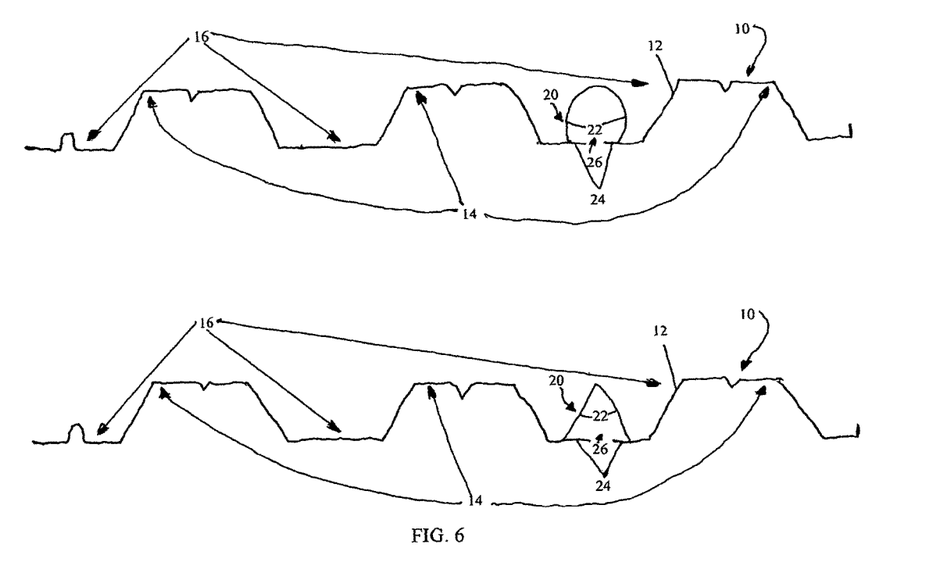
FIG. 6 are front plan views illustrating support channels configured with a generally C-shaped cross-section and a generally V-shaped cross-section in alternative embodiments of the invention.

In alternative embodiments, as shown in FIG. 6, one or more of the support channels 20 may be configured with a generally C-shaped cross-section or a generally V-shaped cross-section, although it should be readily understood by those skilled in the art that one or more of the support channels may be configured with other cross-sections that provide generally opposed side walls 22 having leg portions 24 extending generally laterally inwardly from the corresponding side walls 22 and defining a slot 26 facing generally downwardly from the corrugated metal deck portion 12, without departing from the scope and spirit of the invention. It should also be readily understood by those skilled in the art that the slot 26 may be any size suitable for receiving therethrough and supportably engaging at least portions of anchors or support items 40.

Figure 7:
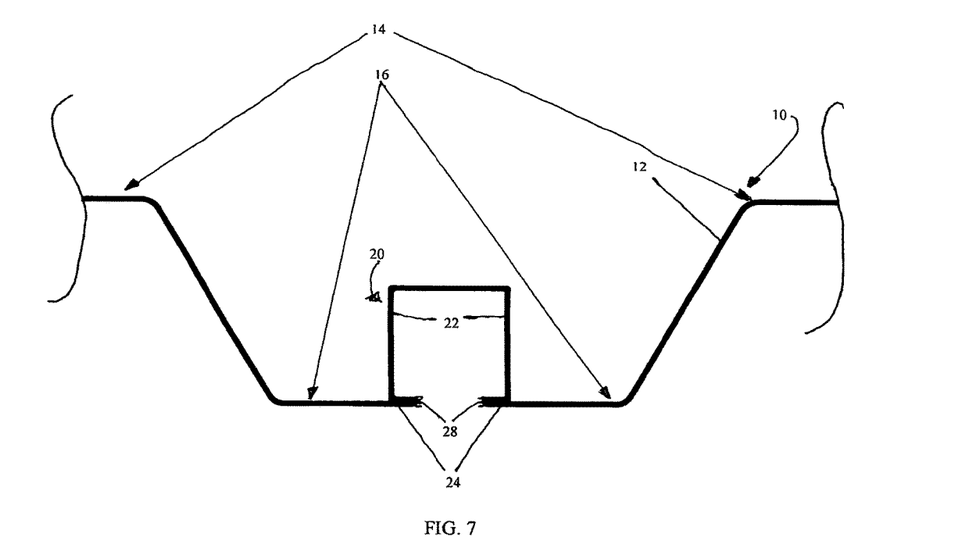
FIG. 7 is a front plan view illustrating a slot with internal threads into which externally threaded portions of anchors or support items may be screwed to fixedly attach the anchors or support items to an integrated support channel in an alternative embodiment of the invention.

In an alternative embodiment, shown in FIG. 7, each slot 26 may be provided with internal threads 28 into which externally threaded portions 42 of anchors or support items 40 may be screwed to fixedly attach the anchors or support items 40 to the one or more integrated support channels 20.

Figure 8:
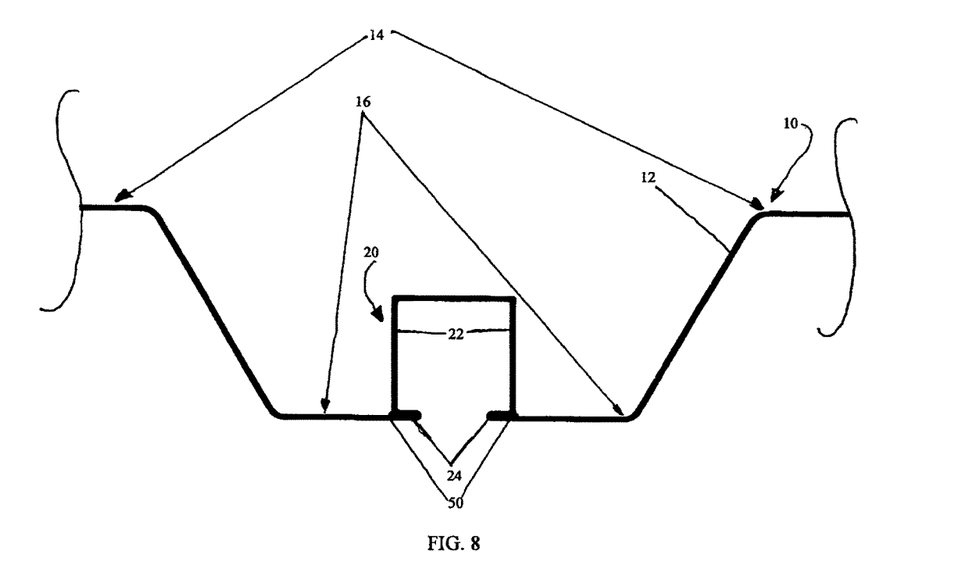
FIG. 8 is a front plan view of a preferred embodiment of the invention illustrating a support channel permanently attached between two deck portions by welding in an alternative embodiment of the invention.

In an alternative embodiment, as shown in FIG. 8, one or more support channels 20 are permanently attached, such as by welding generally indicated at reference numeral 50, between two or more corrugated metal deck portions 12, prior to casting concrete 30 thereon.

It should be readily understood by those skilled in the art that the elongated corrugated metal deck portions 10 may be constructed of alternative, generally planar shapes without departing from the scope and spirit of the invention.

Hence, while the invention has been described in connection with a preferred embodiment and alternative embodiments, it will be understood that it is not intended that the invention be limited to those embodiments. On the contrary, it is intended to cover all alternatives, modifications and equivalents as may be included within the spirit and scope of the invention as disclosed.

As to the manner of usage and operation of the instant invention, same should be apparent from the above disclosure, and accordingly no further discussion relevant to the manner of usage and operation of the instant invention shall be provided.

With respect to the above description then, it is to be realized that the optimum proportions for the elements of the invention, and variations in size, materials, shape, form, function and manner of operation, assembly and use, are deemed readily apparent and obvious to one skilled in the art, and all equivalent relationships described in the specification are intended to be encompassed by the present invention.

Therefore, the foregoing is considered illustrative of only the principles of the invention. Further, since numerous modifications and changes will readily occur to those skilled in the art, it is not desired to limit the invention to the exact method, construction and operation shown and described, and accordingly, all suitable modifications and equivalents may be resorted to, falling within the scope of the invention.

What is claimed is:

1. A metal deck assembly for use in combination with a curable construction material and adapted for holding suspended construction equipment comprising:
   an elongated, corrugated metal deck portion having a length defining peaks and valleys; and
   one or more support channels formed integrally with said corrugated metal deck portion prior to casting curable construction material thereon, each of said support channels extending generally parallel to said peaks and said valleys along the length of said corrugated metal deck portion and being configured with a cross-section having generally opposed side walls and leg portions extending generally laterally inwardly from said side walls and defining one or more slots facing generally downwardly from said corrugated metal deck portion, each of said slots being adapted for receiving therethrough and supportably engaging at least portions of anchors or support items before or after setting concrete on the metal deck assembly, wherein each of said support channels is configured with an inverted generally U-shaped cross-section.

2. A metal deck assembly for use in combination with a curable construction material and adapted for holding suspended construction equipment comprising:
   an elongated, corrugated metal deck portion having a length defining peaks and valleys; and
   one or more support channels formed integrally with said corrugated metal deck portion prior to casting curable construction material thereon, each of said support channels extending generally parallel to said peaks and said valleys along the length of said corrugated metal deck portion and being configured with a cross-section having generally opposed side walls and leg portions extending generally laterally inwardly from said side walls and defining one or more slots facing generally downwardly from said corrugated metal deck portion, each of said slots being adapted for receiving therethrough and supportably engaging at least portions of anchors or support items before or after setting concrete on the metal deck assembly, wherein each of said support channels is configured with an inverted generally V-shaped cross-section.

3. A metal deck assembly for use in combination with a curable construction material and adapted for holding suspended construction equipment comprising:
   two or more elongated, corrugated metal deck portions, each having a length defining peaks and valleys; and
   one or more support channels permanently attached between at least two of said deck portions prior to casting curable construction material thereon, each of said support channels extending generally parallel to said peaks and said valleys along the length of said corrugated metal deck portions and being configured with a cross-section having generally opposed side walls and leg portions extending generally laterally inwardly from said side walls and defining one or more slots facing generally downwardly from said corrugated metal deck portions, each of said slots being adapted for receiving therethrough and supportably engaging at least portions of anchors or support items before or after setting concrete on the metal deck assembly, wherein each of said support channels is configured with an inverted generally U-shaped cross-section.

4. A metal deck assembly for use in combination with a curable construction material and adapted for holding suspended construction equipment, as set forth in claim 3, wherein said metal deck assembly is provided with corrosion protection prior to setting concrete thereon.

5. A metal deck assembly for use in combination with a curable construction material and adapted for holding suspended construction equipment comprising:
   two or more elongated, corrugated metal deck portions, each having a length defining peaks and valleys; and
   one or more support channels permanently attached between at least two of said deck portions prior to casting curable construction material thereon, each of said support channels extending generally parallel to said peaks and said valleys along the length of said corrugated metal deck portions and being configured with a cross-section having generally opposed side walls and leg portions extending generally laterally inwardly from said side walls and defining one or more slots facing generally downwardly from said corrugated metal deck portions, each of said slots being adapted for receiving therethrough and supportably engaging at least portions of anchors or support items before or after setting concrete on the metal deck assembly, wherein each of said support channels is configured with an inverted generally V-shaped cross-section.

* * * * *